United States Patent [19]

Cloke et al.

[11] Patent Number: 4,706,622
[45] Date of Patent: Nov. 17, 1987

[54] ENGINE COMBUSTION CHAMBER CONSTRUCTION

[75] Inventors: Martin Cloke, West Bloomfield, Mich.; Michael Horton, Kerpen, Fed. Rep. of Germany; Rudolf Menne, Gladbach, Fed. Rep. of Germany; Andreas Stwiorok, Cologne, Fed. Rep. of Germany

[73] Assignee: Ford Motor Company, Dearborn, Mich.

[21] Appl. No.: 936,577

[22] Filed: Dec. 1, 1986

[30] Foreign Application Priority Data

Dec. 5, 1985 [DE] Fed. Rep. of Germany ....... 3542965

[51] Int. Cl.$^4$ .................... F02B 31/00; F02B 23/00
[52] U.S. Cl. ................................ 123/306; 123/661; 123/664
[58] Field of Search ............... 123/308, 306, 664, 657, 123/188 M

[56] References Cited

U.S. PATENT DOCUMENTS

| | | | |
|---|---|---|---|
| 3,318,292 | 5/1967 | Hideg | 123/308 |
| 4,201,175 | 5/1980 | Tanaka et al. | 123/657 |
| 4,421,080 | 12/1983 | Kogure | 123/306 |
| 4,658,792 | 4/1987 | Yamashita et al. | 123/308 |

FOREIGN PATENT DOCUMENTS 2359058  8/1974  Fed. Rep. of Germany .
2548134  5/1977  Fed. Rep. of Germany .
2731086  10/1980  Fed. Rep. of Germany .

Primary Examiner—E. Rollins Cross
Attorney, Agent, or Firm—Robert E. McCollum; Clifford L. Sadler

[57] ABSTRACT

A mixture-compressing spark-ignited four-stroke internal combustion engine having a combustion chamber bounded by the piston and the cylinder head, and inlet and exhaust valves, the valve openings of which are offset in plan view in the longitudinal direction of the engine with respect to a transverse plane of the cylinder and the valve stems of which form an acute angle when projected onto the transverse plane of the cylinder, and a squish area opposite a spark plug and parts of the inlet valve opening being masked and supplied with a mixture by a swirl inlet passage, the swirl inlet passage supplying a mixture to the inlet valve opening tangentially, a spark plug being disposed close to the center of the cylinder on the side facing the inlet valve opening, a squish area being provided opposite the spark plug amounting to between 5% and 15% of the cylinder cross-sectional area, and the inlet valve opening being masked on its flow downstream area toward the outer periphery of the cylinder by a downward projection from the top of the combustion chamber through an angle of between 70° and 180° at a height of between 70% and 100% of the valve stroke over a gap width of between 1 and 1.5 mm.

2 Claims, 5 Drawing Figures

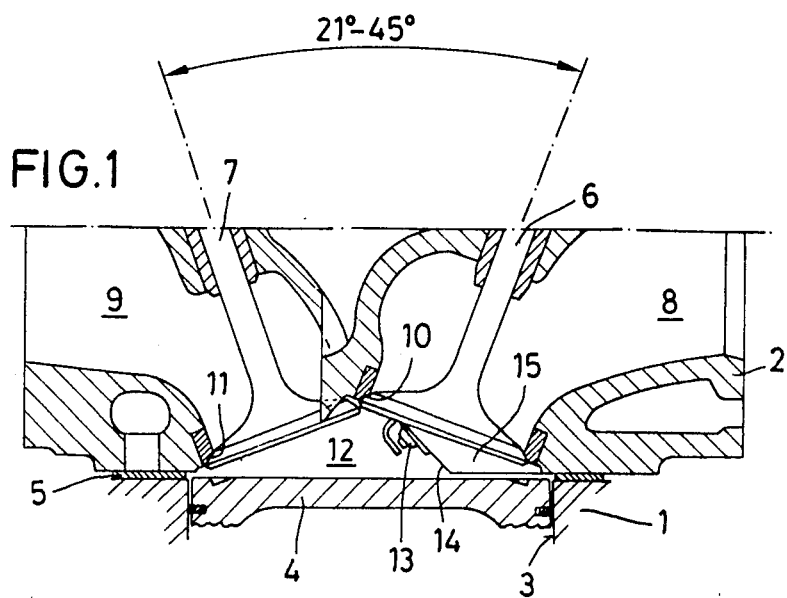
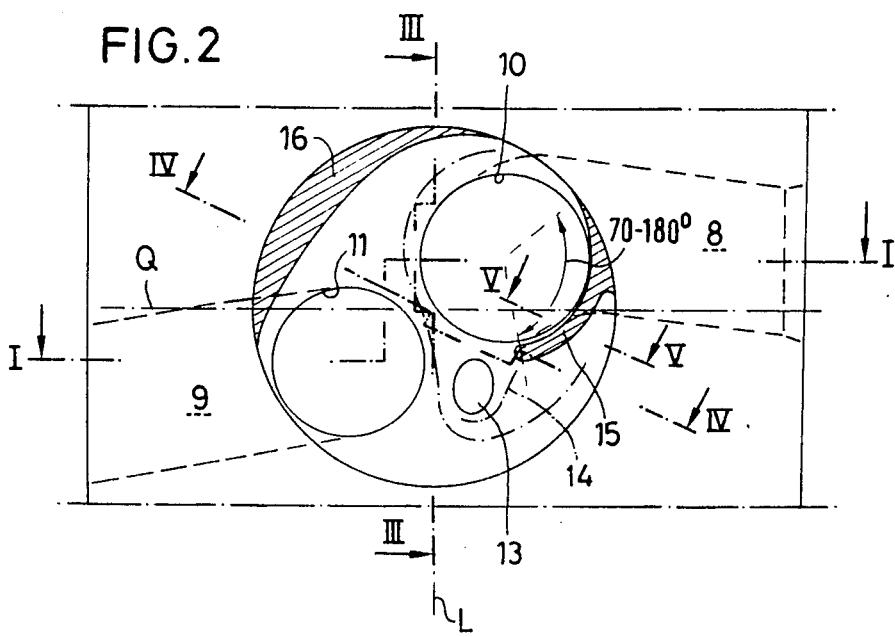

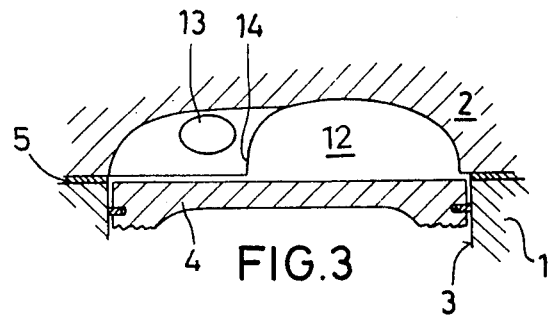
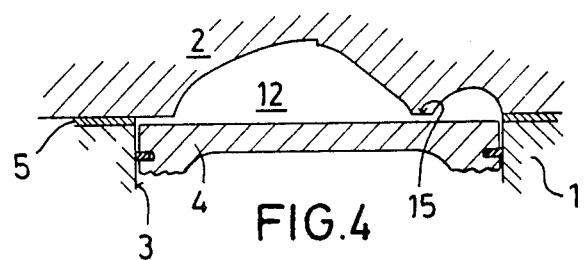
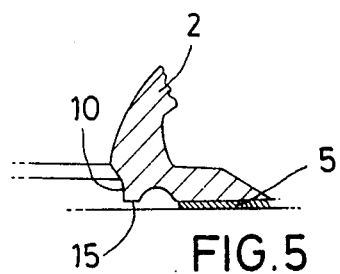

ENGINE COMBUSTION CHAMBER CONSTRUCTION

This invention relates to a mixture-compressing internal combustion engine. More particularly, it relates to a spark-ignited four-stroke internal combustion engine having a compact combustion chamber defined in part by a partially masked swirl inducing inlet port, a near central spark plug located on the inlet valve port side, a squish area opposite the spark plug, and a V-shaped arrangement of the valves actuated by twin over-head camshafts.

German Offenlegungsschrift No. 23 59 058 shows a combustion chamber for a spark-ignited four-stroke internal combustion engine in which the inlet and exhaust valves are arranged in a V-shape, and a squish area located opposite the spark plug partially masks the valve openings.

A similar combustion chamber for a spark-ignited four-stroke internal combustion engine is known from the German Offenlegungsschrift No. 25 48 134. In this case, however, the valves are arranged parallel to one another.

Another mixture-compressing internal combustion engine having features similar to those set forth above is that of the German Pat. No. 27 31 086. In this case, the inlet and exhaust valves are shown so arranged in the combustion chamber 50 that the valve openings are offset in plan view in the longitudinal direction of the engine with respect to a transverse plane of the cylinder, and the valve stems together form an acute angle when projected onto the transverse plane of the cylinder. The inlet valve is arranged parallel to the cylinder axis and the exhaust valve forms an acute angle therewith. This results in the exhaust valve being disposed in a valve recess formed in the cylinder head. The combustion chamber is further defined by a squish area which masks parts of the inlet valve opening acted upon by a swirl inlet port, the squish area being located opposite the spark plug.

The latter arrangement makes possible an expedient actuation of the two valves by way of an overhead camshaft; however, it also requires the combustion chamber to be situated markedly to one side inside the cylinder bore and the piston to have a recess, which enlarges the combustion chamber.

The object of this invention is to design a mixture-compressing internal combustion engine, in particular a spark-ignited four-stroke internal combustion engine, in such a way that it has a more compact combustion chamber than the prior art, and one that has an increased lean-mixture combustibility. In this connection, as a starting point, a V-shaped arrangement of the inlet and exhaust valves is provided, which can be actuated in conventional manner by way of two overhead camshafts.

A swirl inlet passage is provided that acts upon the air-fuel mixture to supply it to the inlet valve opening tangentially. A spark plug is disposed close to the center of the cylinder on the side facing the inlet valve opening. A squish area is formed opposite the spark plug that amounts to between 5 and 15% of the cylinder cross-sectional area. The inlet valve opening is masked on its downstream flow area towards the outer periphery of the cylinder by a portion of the combustion chamber projecting down from the top. The masking extends through an angle of between 70° and 180° at between 70% and 100% of the valve stroke, with a gap width (see FIG. 5) of between 1 and 1.5 mm between the piston and the cylinder head. As a result of all this, a stabilization of the inlet swirl imparted to the air-fuel mixture is achieved in the immediate vicinity of the spark plug, and a stable combustion action is attained with an extremely lean mixture preparation.

The exhaust gas constituents which occur with this lean-type combustion chamber can be reduced to the prescribed limits of exhaust gas emission in a relatively inexpensive way with an unadjusted oxidation catalyst.

By virtue of the fact that the inlet valve opening is provided in its area masked over an angle of between 70° and 180° with a gap enlargement by a bevel in a range of between 50° and 180°, it is possible to ensure an expedient performance of the lean-type combustion chamber.

The invention now will be described in greater detail with reference to an embodiment illustrated in the enclosed drawings in which:

FIG. 1 is a vertical sectional view along the line I—I in FIG. 2;

FIG. 2 is a diagrammatic plan view of the combustion chamber according to the invention;

FIG. 3 is a sectional view along the line III—III in FIG. 2;

FIG. 4 is a sectional view along the line IV—IV in FIG. 2; and

FIG. 5 is a partial sectional view along the line V—V in FIG. 2.

FIGS. 1 and 3-5 show vertical partial sections through the combustion chamber of a cylinder of a spark-ignited four-stroke internal combustion engine. It includes a cylinder head 2 mounted on a cylinder block 1 with the interposition of a conventional cylinder head seal 5. A cylinder bore 3, in which a piston 4 is arranged to reciprocate vertically, is formed in the cylinder block 1.

The cylinder head 2 includes inlet and exhaust passages 8 and 9, respectively, controlled by inlet and exhaust valves 6 and 7, respectively. The inlet and exhaust passages 8 and 9 are connected by inlet and exhaust valve ports 10 and 11, respectively, opening into the combustion chamber 12. The latter closes or terminates the cylinder 3 at the top. A spark plug 13 projects into the combustion chamber 12.

As shown in FIG. 1, the stems of valves 6 and 7 are arranged inclined with respect to one another when projected onto a transverse plane Q (see FIG. 2) of the cylinder in such a way that they form an acute angle of between 21° and 45°, for example. The valves 6 and 7 can be actuated in a manner not shown, but known per se, by way of two overhead camshafts, for example. Alternatively, they can be actuated by way of a single overhead camshaft through suitable rocker arms.

As shown in FIG. 2, the inlet and exhaust valves 6 and 7 are arranged in such a way that when seen in plan view they are offset in the longitudinal direction of the engine with respect to the transverse plane Q of the cylinder. The spark plug 13 in this case is disposed on the side of the bore axis adjacent the inlet valve 6 in a wall portion 14 (see FIGS. 1 and 3) that projects down from the top of the combustion chamber 12, in order to bring the spark gap as close as possible to the center of the cylinder.

The downwardly projected wall portion 14 continues circumferentially as a depression 15 (see FIGS. 1, 2, 4 and 5) to embrace or partially surround (see FIG. 2) the inlet valve opening 10 in the downstream flow area through an angle of between 70° and 180°. In this connection, the depression 15 also extends into the combustion chamber 12 for a depth or height (see FIGS. 1, 4 and 5) of between 70% and 100% of the total valve stroke, and masks the disc of the inlet valve 6 with a gap width of a between 1 and 1.5 mm between the piston and depression 15 (See FIGS. 4 and 5), and with a gap enlargement by a bevel in a range of between 50° and 180°.

A squish area 16 (see FIG. 2) which amounts to between approximately 5% and 15% of the total cylinder cross-sectional area is located diagonally opposite the spark plug 13.

With the arrangement shown in FIG. 2, the swirl inlet passage 8 causes the air-fuel mixture to flow through the inlet valve opening 10 tangentially. The masked portion or depression 15 stabilizes the swirling action in the region towards the outer periphery of the cylinder such that a stable swirling action is maintained in the vicinity of the spark plug 13. Therefore, even lean air-fuel ratios with a λ of 1.6 can be reliably ignited and burned.

This invention has been illustrated in connection with a single cylinder. However, it should be pointed out that in the case of a four-cylinder engine, the combustion chambers can be provided alternately in a mirror-inverted arrangement, for example, in which case the swirl produced by the swirl inlet port and the tangential action upon the inlet valve opening would not rotate in the counter-clockwise direction, as shown in FIG. 2, but in the clockwise direction.

While the invention has been shown and described in its preferred embodiment, it will be clear to those skilled in the arts to which it pertains that many changes and modifications may be made thereto without departing from the scope of the invention.

We claim:

1. A mixture-compressing spark-ignited four stroke internal combustion engine having a combustion chamber bounded by a piston and a cylinder head, and inlet and exhaust valves, the valve openings being offset from the centerline of the bore in plan view in the longitudinal direction of the engine with respect to a transverse plane of the cylinder, and valve stems angled at an acute angle with respect to each other when projected onto the transverse plane of the cylinder, the engine including a spark plug and means projecting into the combustion chamber providing a squish area opposite the spark plug, and means providing a partially masked inlet valve opening connected to a swirl inlet passage, characterized in the swirl inlet passage being so constructed and arranged as to pass any fluid therein therethrough tangentially into the inlet valve opening, the spark plug being disposed close to the center of the cylinder on the side of the bore centerline adjacent to and facing the inlet valve opening, the squish area opposite the spark plug being in the range of between 5% and 15% of the cylinder cross-sectional area, and means projecting downwardly from the top of the combustion chamber and from the downstream flow area of the inlet valve opening towards the outer periphery of the cylinder bore through a circumferential angle of between 70° and 180° at a height of between 70% and 100% of the total valve stroke and over a gap width of between 1 and 1.5 mm between the projecting means and the piston.

2. An internal combustion engine according to claim 1, characterized in that the inlet valve opening masked area is provided in its area masked over an angle of between 70° and 180° with a gap enlargement by bevelling in a range of between 50° and 180°.

* * * * *